United States Patent [19]
Guthrie

[11] Patent Number: 5,963,018
[45] Date of Patent: Oct. 5, 1999

[54] AUTOMOBILE BATTERIES WITH INHERENT IMMOBILIZERS

[75] Inventor: Allan G. A. Guthrie, Southend-on-Sea, United Kingdom

[73] Assignee: Exide Batteries Ltd., Reading, Pa.

[21] Appl. No.: 08/924,955

[22] Filed: Sep. 8, 1997

[51] Int. Cl.⁶ .............................. H02J 7/00; B60R 25/04
[52] U.S. Cl. ...................... 320/136; 307/10.3; 340/426; 340/428
[58] Field of Search .................................... 320/136, 135; 180/287; 307/10.2, 10.3, 10.4, 10.5, 10.6; 340/426, 428, 429, 430; 429/7

[56] References Cited

U.S. PATENT DOCUMENTS

| | | | |
|---|---|---|---|
| 4,553,127 | 11/1985 | Issa | 307/10.3 |
| 5,023,591 | 6/1991 | Edwards . | |
| 5,397,925 | 3/1995 | Carlo et al. | 307/10.3 |
| 5,404,129 | 4/1995 | Novak et al. | 340/428 |
| 5,449,957 | 9/1995 | Carlo | 307/10.3 |
| 5,498,486 | 3/1996 | Gatehouse . | |
| 5,552,642 | 9/1996 | Dougherty et al. | 307/10.3 |
| 5,729,192 | 3/1998 | Badger | 340/426 |

FOREIGN PATENT DOCUMENTS

| | | |
|---|---|---|
| S950423 | 12/1996 | Ireland . |
| 2319 653 | 11/1996 | United Kingdom . |

OTHER PUBLICATIONS

Letter to Wragge & Co. from Gartside, Harding & Davies dated Jul. 14, 1998, 2 pgs.
Peter Gatehouse Letter to Exide Corporation, May 3, 1998, 2 pgs.
Diagram of Compuguard, 2 pages.
"The New Tudor Intelligent Battery," the Tudor Group Intelligent Battery Advertisement, 1 page.
Peter Gatehouse Letter dated May 10, 1999 w/attachments (7 pages).

*Primary Examiner*—Peter S. Wong
*Assistant Examiner*—K. Shin
*Attorney, Agent, or Firm*—Nixon & Vanderhye P.C.

[57] ABSTRACT

A battery immobilizer is described in which power provided by the battery to the ignition switch of an automobile is discontinued when the starter motor of the automobile is engaged without proper previous authorization. The authorization is provided by entry of a user code on a keypad within the automobile compartment. Once the code is entered, the automobile will start as normal, but if the code is not entered the battery will intelligently provide power to resistive loads while disconnecting power to the starter motor once the immobilizer detects that the starter motor has been engaged. The present battery can be connected to an automobile system using only standard electrical connections between the automobile electrical system and the battery and further does not require any connection between the immobilizer circuit and the user keypad.

17 Claims, 8 Drawing Sheets

AUTOMOBILE BATTERIES WITH INHERENT IMMOBILIZERS

FIELD OF THE INVENTION

This invention relates to automobile batteries and, more particularly, to automobile batteries with inherent immobilizers to prevent unauthorized usage of automobiles in which the batteries are installed.

BACKGROUND OF THE INVENTION

Automobile theft continues to be a problem and many methods and apparatus are developed each year to address this problem. One such method, described in U.S. Pat. No. 5,498,486, is to modify a usual battery—having usual positive and negative battery posts—by installing two dummy terminals near the two usual positive and negative battery posts. The negative "dummy" is in electrical contact with the usual negative battery post and the positive "dummy" is connected through a switch to the usual positive battery post. Those usual posts are then covered by a lid leaving only the positive and negative dummy posts exposed. The solenoidal switch is placed between the positive dummy terminal and the positive covered battery post to open or close connection between them by a relay operation. Specifically, the '486 patent describes a relay controller that operates between an Enable circuit that permits current to travel between the positive dummy and usual positive post and an Inhibit circuit that prevents current from so traveling. The relay controller is activated by a user keypad in the automobile and connected to the controller at the battery.

In prior inhibitors, when the user entered the correct key information, the relay controller closed the connection between the positive dummy post and the usual positive post, thus connecting the battery across the starter motor. Without the correct code, the relay controller opened the connection between the dummy post and the usual post. Since the normal battery cable from the automobile to the battery was connected to the dummy post, the automobile usually received power only when the relay controller closed the connection between the dummy post and the usual post.

These prior inhibitors suffered some significant drawbacks. First, they failed to adequately address how the operation of automobile loads (such as hazard lights, headlights, etc.) can be maintained even when the anti-start mechanisms are in place. Further, the '486 patent, for example, taught that four different terminals were needed on the battery (including at least one apparently unique type of terminal) just for connection (or ultimate connection) to the positive battery cells. The '486 patent thus taught a "dummy" positive post (for connection to the starter load), a "real" positive post (hidden under a lid), a "terminal 6" for connection to the ignition coil, and a "terminal 5" for connection to "any other leads." Four terminals were thus needed in this prior battery for connecting the electrical system of the automobile. In commercial batteries, the terminals 5 and 6, respectively, were used to detect the operation of the ignition coil or the car hood release. These detection lines then told the control circuit to shut off the battery whenever the starter was engaged or the hood opened without previous code-entry. Such a system is extraordinarily complex and requires too many different types of automotive battery leads to be connected to different parts of the battery.

In addition, the operation of prior inhibitor circuits professed a desirability of giving the appearance of a flat battery when the user code had not been properly entered. That is, even though an automobile electrical system may be connected through to the battery during a disabled arrangement, the current available to the electrical system was diminished by a resistor to a minimal value (such as 0.8 amps) to give the operator the impression that the battery was dead. In fact, even if the authorized user entered the appropriate code, thus closing the usual and dummy battery terminals, the connections would "time out" after a set time period. Thus, the battery would be either completely inoperative or appear as a "flat battery" even to an authorized user after the set time period expired. This prevented the user from using the hazard lights, for example, after abandoning the automobile, since the lights would time out to a "flat battery" condition.

Still further, prior inhibitors required a connector on the inhibitor, for the keypad to input the entry code from the user. This arrangement is also overly complicated.

SUMMARY OF THE INVENTION

An inhibitor that is substantially different and better than prior inhibitors would be desirable. To that end, the present invention provides an inhibitor that is controlled not by a simple ON/OFF switch control on a hidden usual battery terminal, but by an intelligent system that determines a type of load being applied to the battery. Loads such as headlights, hazard lights, interior equipment, etc. can be powered normally by the present invention, even if the authorization device is not engaged. The present inhibitor is substantially different and better since it intelligently determines whether the starter is being engaged, and if so, removes sufficient power from the starter motor to preclude its operation. Other loads, which have no bearing on the operability of the automobile motor, are permitted normal operation.

Further, the present inhibitor is dramatically more efficient and simple in construction than prior inhibitors since it completely eliminates dual dummy/usual posts and keypad connections.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which.

DETAILED DESCRIPTION OF THE PRESENTLY PREFERRED EMBODIMENTS

In accordance with the present invention, an automobile battery is rendered inoperative with respect to the starter motor of an automobile unless an authorized user inputs an appropriate user code into an entry device within the automobile compartment. The immobilizer circuit is included within the battery itself, between the positive battery cells and the positive battery posts extending from the battery casing. An example of an embodiment of the present invention is shown in FIG. 1a.

The battery 1 includes battery cells divided into positive polarity cells and negative polarity cells. Between the cells, as is well known in the battery art, a current is generated. Ordinarily, the positive and negative cells are directly connected to, respectively, positive post 2 and negative post 3 extending from the battery casing. In the present invention, however, the normal connection between the positive battery cells and the positive post 2 is interrupted by the immobilizer 10.

Figure 1A:
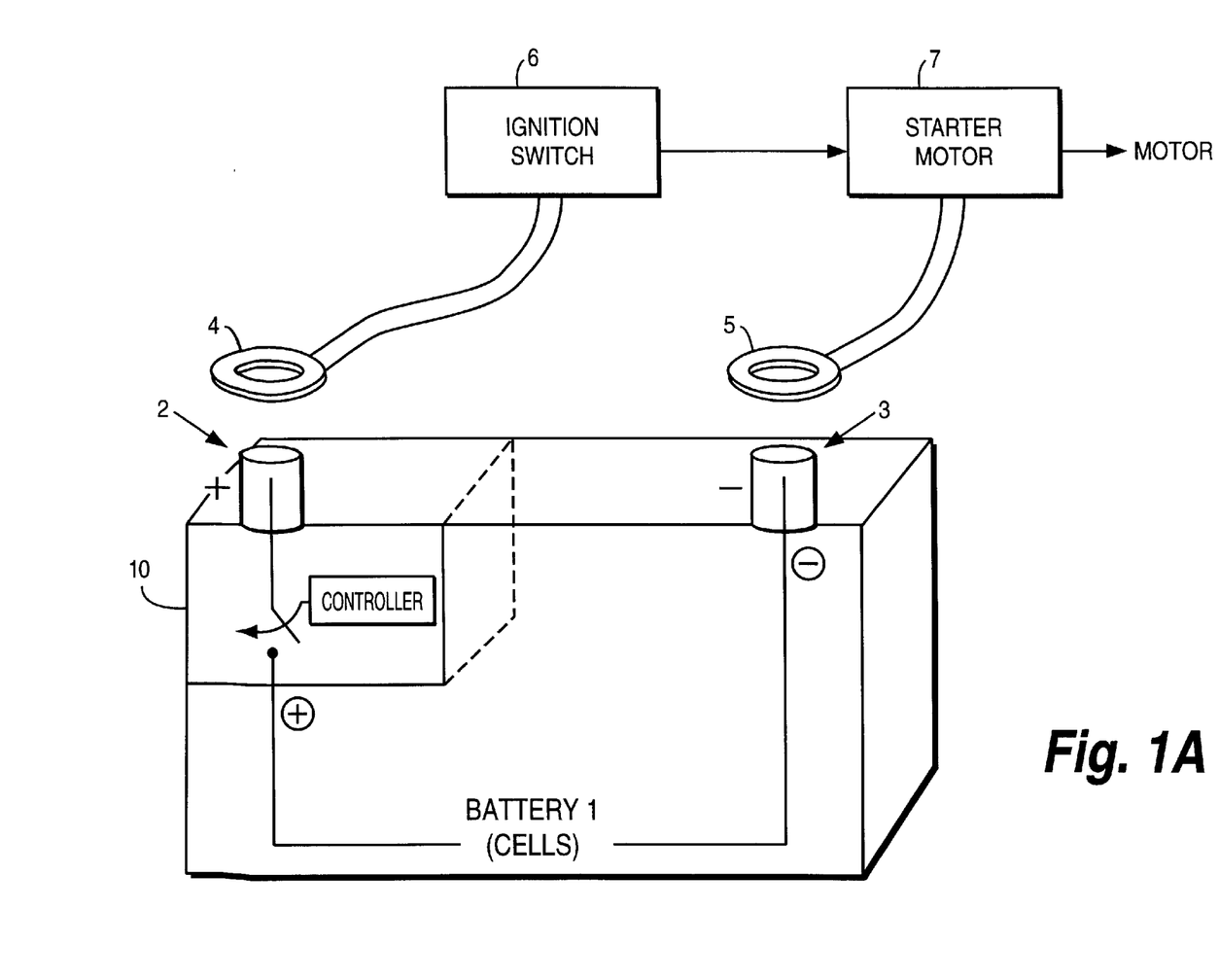
FIG. 1a is a schematic representation of an example embodiment according to the present invention.

To the user of the battery 1 of FIG. 1a, the battery 1 appears no different than an over-the-counter type battery. That is, the user would connect a positive battery lead 4 to the positive post 2, in the usual way that one would connect the positive lead of an automobile to the positive post of an over-the-counter battery. In the same way, ordinary automobile lead 5 is connected to negative battery post 3. Typically, the negative post 3 is connected to the chassis of the automobile via the negative lead 5, which completes the circuit through the ignition switch 6 and starter motor 7 to start the motor of the automobile.

Figure 1B:
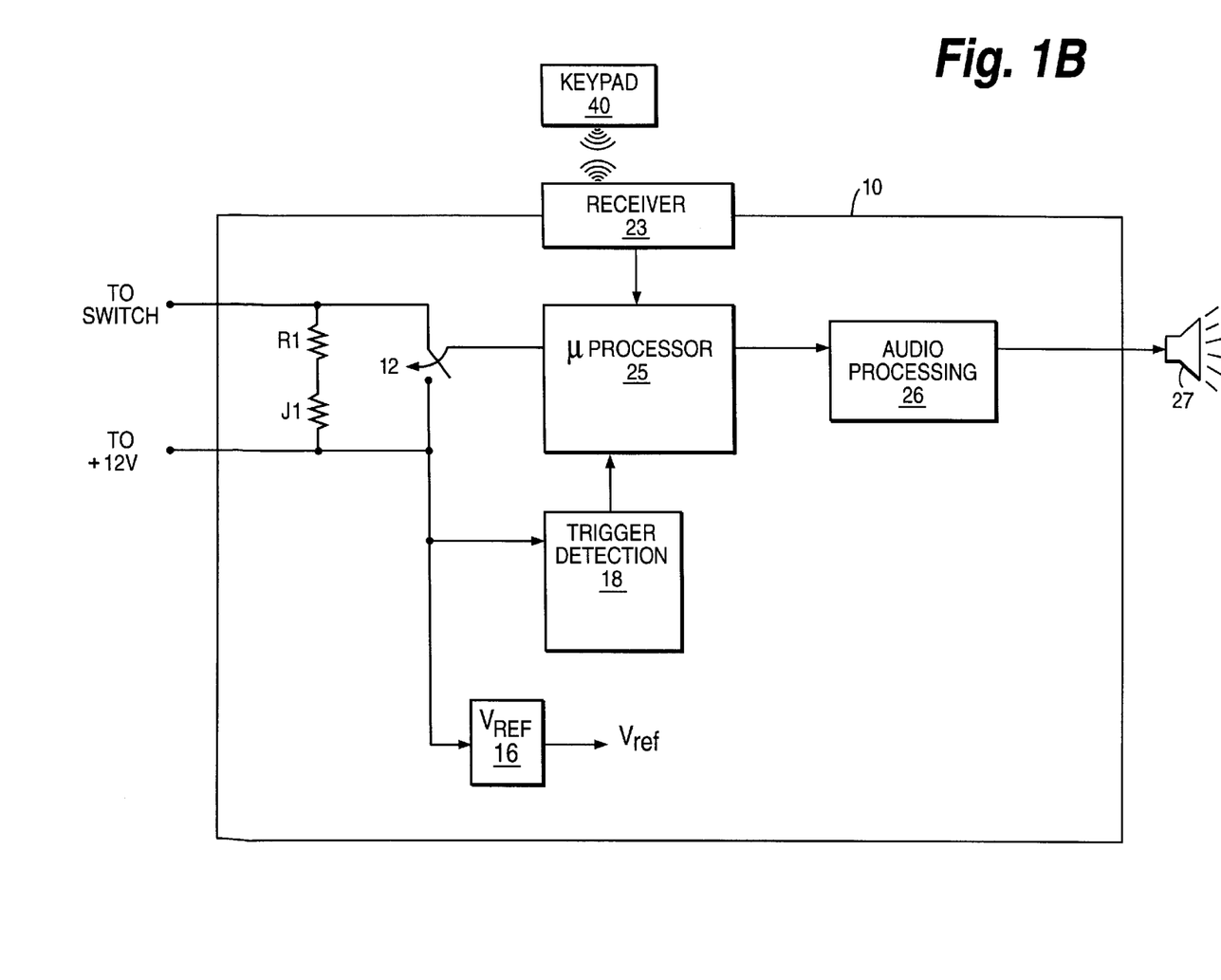
FIG. 1b is an electrical schematic diagram of an inhibitor circuit according to one example embodiment of the present invention.

FIG. 1b is a general circuit diagram of the inhibitor 10 of FIG. 1a. As shown in FIGS. 1a and 1b, the inhibitor 10 connects to the ignition switch 6 via an ignition switch input. Also, the inhibitor 10 has a battery voltage input (to +12 V) for connection to the positive battery cells of the battery. Connected in parallel between the ignition switch input and the battery voltage input is a series combination of a resistor R1 and a thermal fuse J1, the operation of which will be described in greater detail below. Also connected in parallel to the ignition switch input and battery voltage input is a solenoid switch 12 controlled by a microprocessor 25. The microprocessor 25 receives input signals from a receiver 23, which communicates with a keypad 40 (or other type of input device) via a connectionless transmission path, such as infra-red, etc. The receiver 23 receives an indication from the keypad 40 of an entry made by a user within the automobile compartment, thus telling the receiver 23 whether the automobile user has entered a correct authorization code to enable the battery 1. The receiver 23 provides this code to the microprocessor 25, which verifies the validity of the entry made by the user on the keypad 40. The microprocessor 25 also receives an input signal from the trigger detection circuit 18, which monitors the load on the positive battery plates (via the battery voltage input) to determine the type of load being applied to the positive battery cells at any given moment. The operation of the trigger detection circuit 18 will be described in greater detail below. The positive battery plates are also connected to a voltage reference circuit 16, which provides a standard voltage reference to operate the components of the immobilizer circuit 10.

Optionally, the microprocessor 25 can also control an audio processing circuit 26, which provides audio signals to a speaker 27, to indicate to a user various conditions of the immobilizer circuit 10.

Figure 1C:
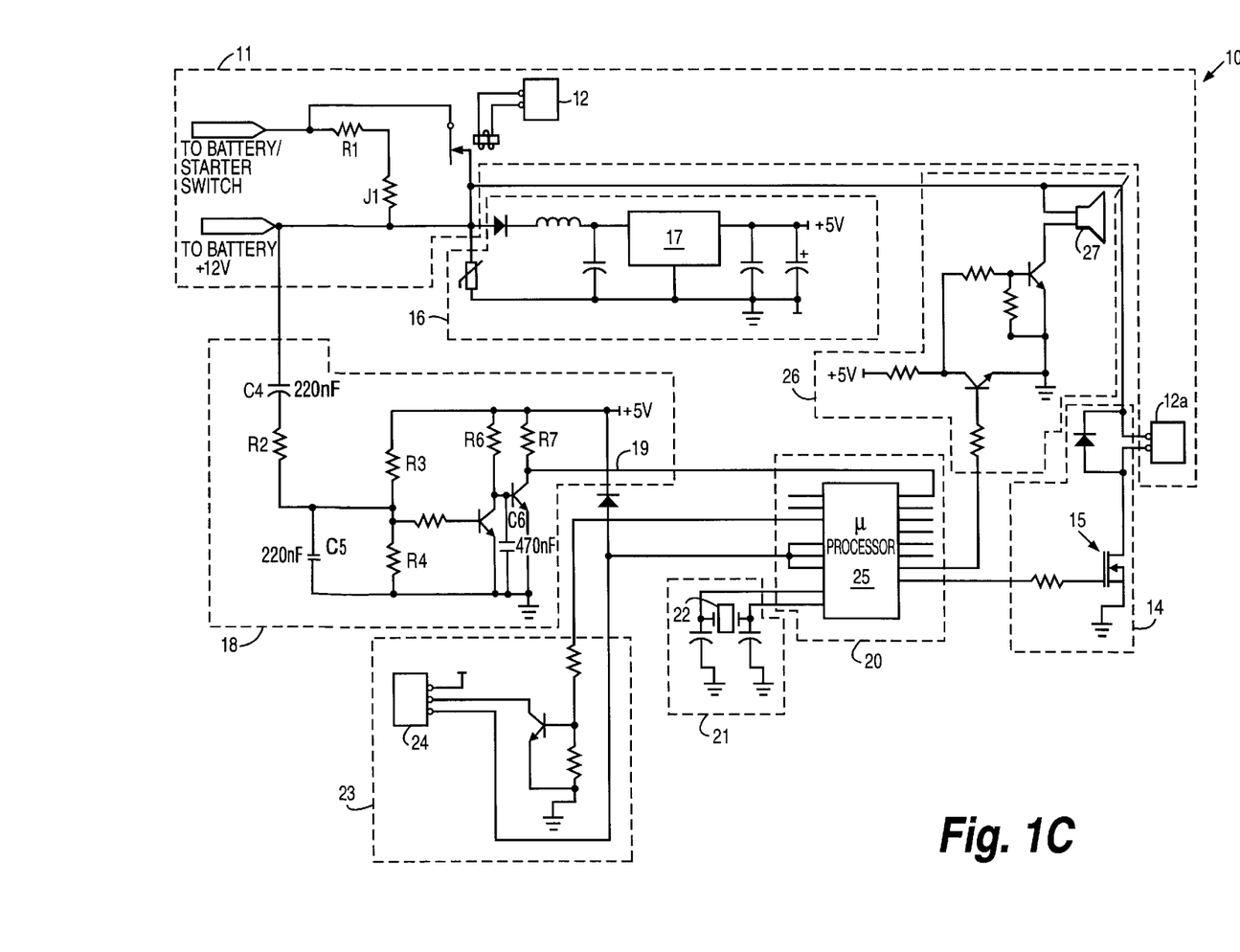
FIG. 1c is a more detailed electrical schematic diagram of the example embodiment of FIG. 1b.

FIG. 1c shows a more detailed electrical schematic diagram of the various components described in the example embodiment of FIG. 1b. Beginning at the battery voltage input and the ignition switch inputs at the top left of FIG. 1c, the power circuit 11 includes the resistor R1 and thermal fuse J1 in parallel with the solenoid switch 12. As can be seen from the power circuit 11 of FIG. 1c, when the solenoid 12 is open, current passes from the ignition switch input and the battery voltage input through the series combination of the resistor R1 and the thermal fuse J1. Alternatively, when the solenoid switch 12 is closed, the resistor R1 and fuse J1 are shorted out, and the battery voltage input is directly connected to the ignition switch input. In this latter case, the full voltage from the positive battery cells is applied to the starter switch 6 (FIG. 1a) to turn over the starter motor 7 and start the automobile motor.

When the solenoid 12 is open, the series combination of resistor R1 and thermal fuse J1 permits a limited amount of current to travel from the ignition switch input to the battery voltage input. In this situation, the immobilizer circuit 10 will pass a certain amount of current to power certain loads in the automobile. For example, the circuit can pass about 1 amp in order to support the electronic memories in the automobile. Alternatively, the resistor R1 can be chosen to pass greater current, depending on what types of loads one wishes to permit supply while the solenoid switch 12 is open. The thermal fuse J1 is designed to move from a very low resistance state to a very high resistant state if the solenoid remains open for an extended time. The thermal fuse is designed to self re-set to the low resistance state when the solenoid closes or the loads are removed. A more detailed view of the solenoid switch 12 and other aspects of the power circuit 11 are shown in FIG. 2.

Figure 2:
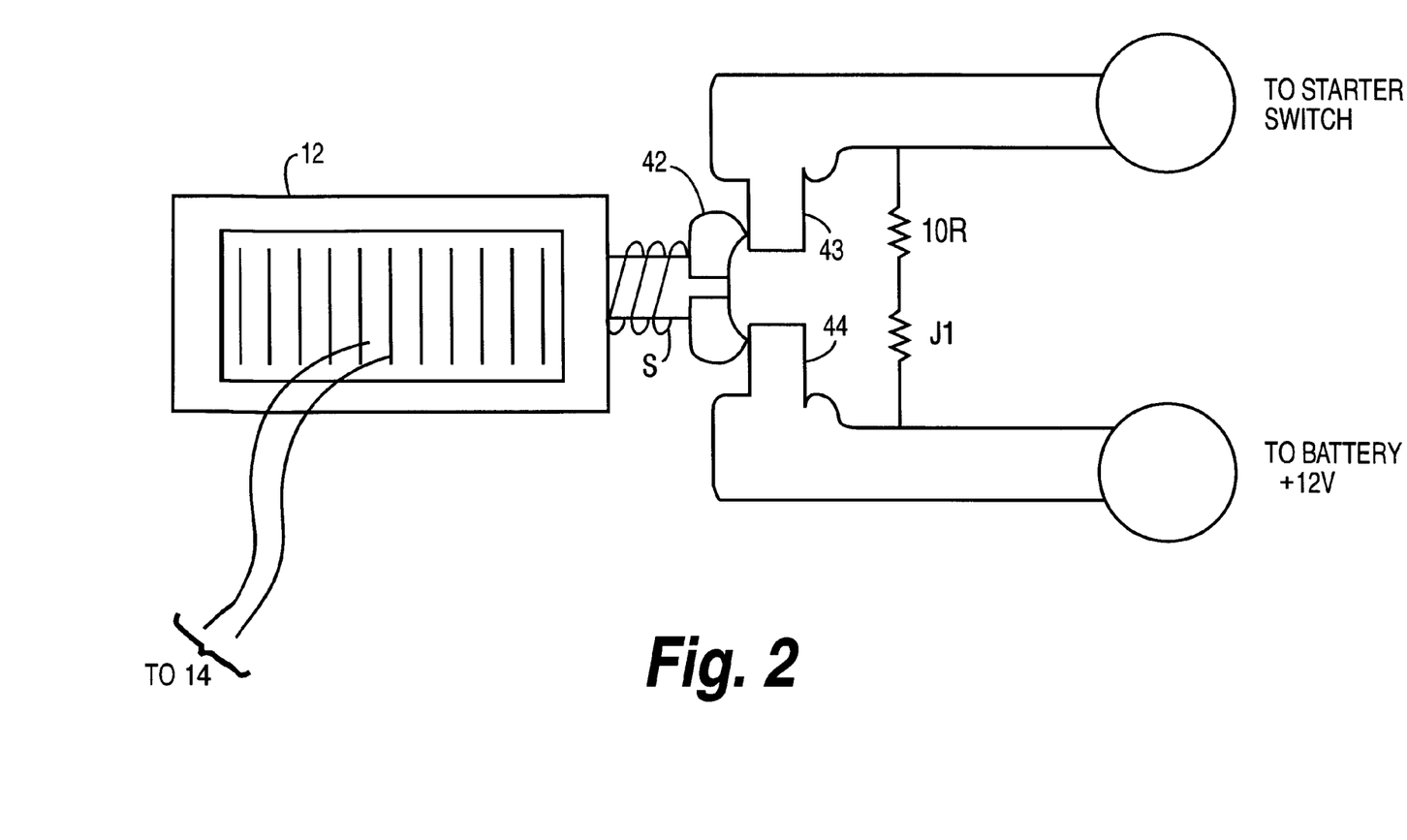
FIG. 2 is a schematic representation of the switch and by-pass circuit of an example embodiment of the present invention.

In FIG. 2, the solenoid 12 is shown operating in conjunction with the starter switch input and the battery voltage input (+12 V). In particular, when the solenoid 12 is not energized, a spring S extends the shorting bar 42 against the switch contact 43 and the battery voltage contact 44. The switch contact 43 is in electrical contact with the starter switch input and the battery voltage contact 44 is in electrical contact with the battery voltage input. When the shorting bar 42 is extended by the spring S against the contacts 43 and 44, the battery voltage input is shorted to the ignition switch output, thus delivering full battery power to the ignition switch 6 of the automobile. When the shorting bar 42 is open (i.e., not extending against the contacts 43 and 44), the current between the battery voltage input and the ignition switch input proceeds through the resistor R1 and thermal fuse J1, as shown in FIG. 2, and described with respect to FIGS. 1b and 1c above.

Returning to FIG. 1c, the power circuit 11 includes, in addition to the solenoid switch 12 connected in parallel to the resistor R1 and thermal fuse J1, solenoid control lines 12a controlled by an immobilizer switch circuit 14. The immobilizer switch circuit 14 can be a MOSFET 15 connected between ground and one input line of the solenoid control 12a. When the MOSFET 15 is turned on, one input line on the solenoid control 12a is connected to ground, while the other input line is connected to the battery voltage input. These input lines are more particularly shown in the left portion of FIG. 2. Once the input lines have the previously described voltage difference between them, the solenoid control 12a causes the solenoid 12 to open, pulling the shorting bar 42 away from the contacts 43 and 44. The control of the MOSFET 15 is described in greater detail below with respect to the processor circuit 20.

The semiconductors used in the immobilizer 10 must receive a power supply voltage. This power supply voltage is provided by the reference voltage circuit 16, which accepts 12 volts from the battery voltage input and regulates it via voltage regulator 17 to a constant 5 volt power supply.

The battery voltage input (+12 V) also supplies the trigger circuit 18. The purpose of the trigger circuit 18 is to detect when loads attached to the battery voltage input (i.e., electrically connected to the battery plates) are loads associated with the starter motor versus loads associated with some other portion of the automotive electrical system. Essentially, the trigger circuit 18 acts as a voltage drop detector circuit, which is particularized in its ability to discriminate between a voltage drop caused by a resistive load of, for example, the head lights, etc. versus a voltage drop caused by the starter motor and its solenoid. In the trigger circuit 18, the +12 volt battery supply is provided via the battery voltage input to a capacitor C4. The capacitor C4 is chosen to detect the rate of change of voltage (dv/dt) on the battery input and to block low frequency signals yet pass high frequency ones. The total network comprising C4, R2, C5, C6, R3, and R4 have values selected which allow it to only pass those signals which are associated with the starter motor and its solenoid and block those corresponding to resistive loads such as automobile lights. As an example embodiment, C4 can have a value of 220 nF, C5 of 220 nF, and C6 of 470 nF. The signals passed by capacitor C4 are provided to the junction of resistors R3 and R4, which are set to provide a threshold voltage drop value. When the voltage drop value is exceeded, the trigger circuit 18 sends a trigger output pulse on trigger output line 19 to the processor circuit 20. Thus, when the starter motor and solenoid are operated in the automobile, they load the battery voltage input, causing a high frequency voltage drop, which is sensed by the trigger circuit 18 as being characteristic of the starter motor and its solenoid coming into operation. Upon detecting such, the trigger circuit 18 notifies the processor circuit 20 that the starter motor and solenoid have been operated.

C5 and C6 have been helpful in preventing the detector circuit from triggering on a quick, instant voltage drop caused by, for example, headlight switching. Also, the trigger circuit is designed to pause about 0.1 sec. after a voltage drop before switching the solenoid switch 12 so the current spike (of maybe 600 amps) can depress somewhat (to maybe 300 amps) before the switching occurs. This is optional and allows the device to switch a lower current level, which is an easier effort. Since most automobiles start after about 0.4 sec. of starter voltage, the pause can safely be made for about 0.1 sec. to 0.3 sec. to permit current reduction while ensuring that the switch operates before the car starts.

A benefit of the trigger circuit 18 according to the preferred embodiment of the present invention is that it will distinguish between loads applied to the battery voltage input which are resistive, such as headlights, etc., versus the load associated with the start motor and its solenoid. This allows the immobilizer 10 to make determinations about whether to enable the ignition switch or disable the ignition switch when the starter motor and its solenoid are detected to be beginning operation. Importantly, the immobilizer 10 according to the presently preferred embodiment will not be fooled into believing that a loading caused by resistive elements is the starter motor and its solenoid beginning operation, when in fact the starter motor and its solenoid are not being operated.

As discussed in the preceding paragraphs, the trigger circuit 18, when it detects that the starter motor and its solenoid in particular are beginning operation, provides a trigger output pulse on output line 19. This output pulse is provided to a processor circuit 20. In response to the trigger output on line 19, the processor circuit 20 will issue a pulse to MOSFET 15 to cause it to conduct and complete the circuit from the solenoid control input line to ground. Of course, if the user has proven to be an authorized user through entry of an appropriate code on the entry device 40, the processor circuit 20 will recognize that condition through means described shortly and will thereby leave MOSFET 15 open and not provide the ground signal to the solenoid control 12a input lines.

The processor circuit 20 receives a clock signal from clock circuit 21, which includes oscillator 22 and appropriate circuitry which would be known to those of ordinary skill in the art.

As described previously, the processor circuit 20 receives an indication when a user enters an appropriate code on the keypad 40. This is received by way of receiver circuit 23. The receiver circuit 23 has as its principle component radio (or IR) receiver 24 which receives coded signals transmitted by the user's keypad 40. Thus, when the user enters an authorization code on the keypad 40 within the automobile driver compartment, the keypad 40 transmits by radio, infra-red, or other communication means, a transmission signal which includes the code entered by the user on the keypad 40. The radio receiver 24 receives a transmission from the keypad 40 and provides the code to processor circuit 20. Processor circuit 20 then can decipher the code to determine whether the code is the correct authorization code. If so, the processor circuit 20 will consider the immobilizer circuit 10 to be disarmed and will therefore not cause MOSFET 15 to conduct when trigger circuit 18 indicates to the processor circuit 20 that the starter motor and its solenoid have been engaged. Alternatively, if the processor circuit 20 receives a code from the receiver circuit 23 indicating that the user is not authorized, the processor circuit 20 will consider the immobilizer 10 armed such that when trigger circuit 18 indicates to processor circuit 20 that the starter motor and its solenoid have engaged, processor circuit 20 will cause MOSFET 15 to conduct in the immobilizer switch circuit 14, thereby providing current through solenoid control lines 12a and correspondingly opening the switch 12 between the battery voltage input and the ignition switch input of the power circuit 11.

As one can see from an analysis of FIG. 1c, the present invention does not require any terminals on the exterior of the battery, other than the single positive and negative posts shown in FIG. 1a. That is, unlike the prior immobilizers, the present invention does not need separate terminals for the ignition switch, starter motor, and the other automotive loads to connect to the battery cells. Rather, the circuitry shown in FIG. 1c is intelligent enough to decipher when loads attached to the battery are associated with the starter motor and solenoid versus some other type of automotive load. Further, the present invention does not require separate dummy and positive terminals on the battery in order to provide the security of an immobilizer to prevent sufficient current from being provided to the starter motor and solenoid when an unauthorized user attempts to start the automobile.

Figure 3:
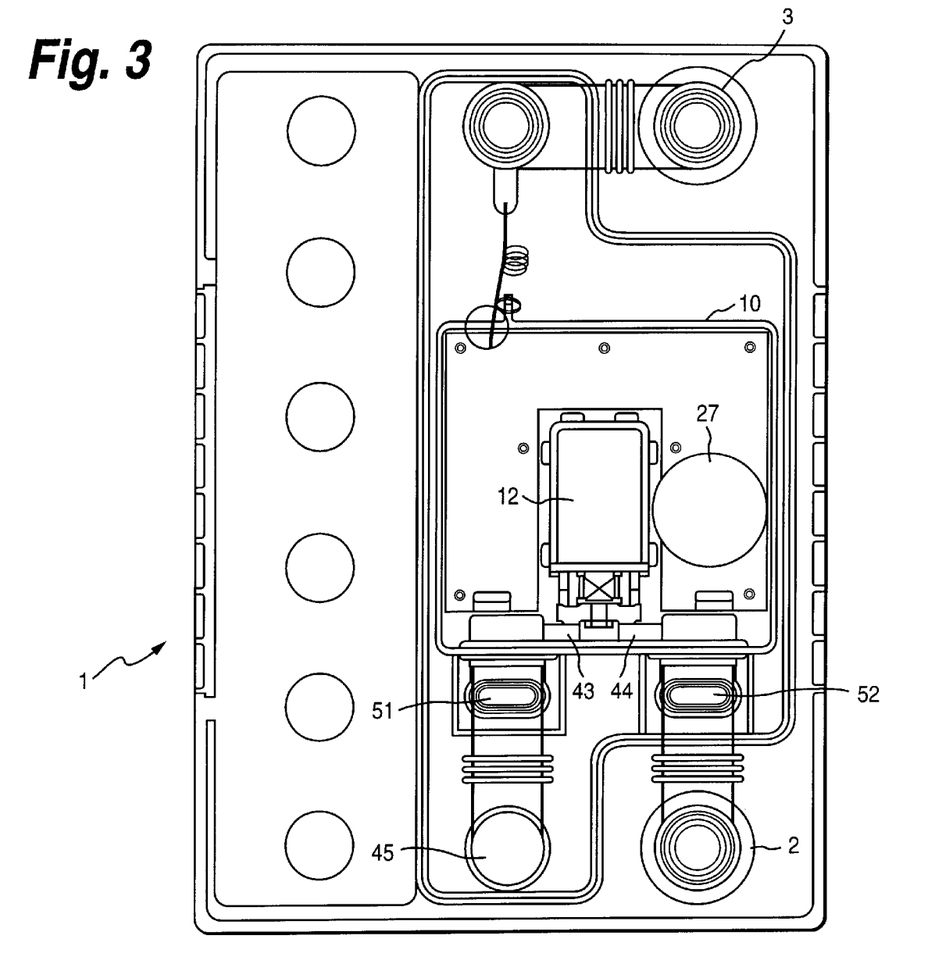
FIG. 3 is a top plan view of a battery according to an alternative example embodiment of the present invention.
Figure 4:
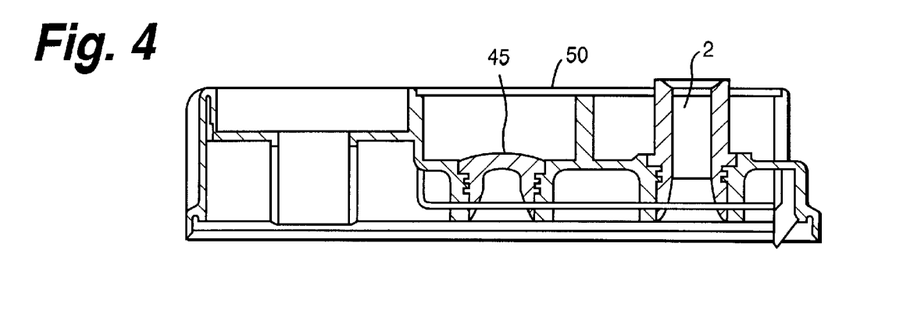
FIG. 4 is a front elevation view of FIG. 3.
Figure 5:
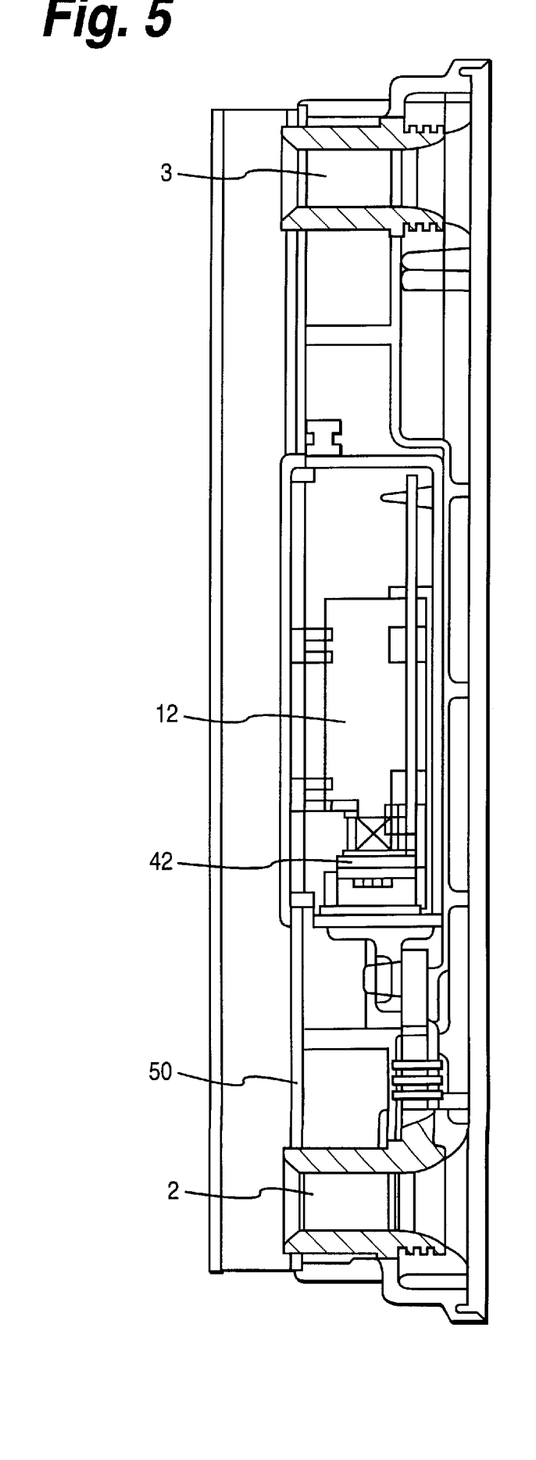
FIG. 5 is a left elevation view of FIG. 3.

Another example embodiment is shown in FIGS. 3–5. In FIG. 3, the battery 1 is shown in a top view with positive post 2 and negative post 3 being exposed for connection. With the present invention, no further terminals are required, such as terminals for non-starter motor loads or terminals for the keypad entry device. In the example embodiment of FIGS. 3–5, the positive cells contact meniscus pad 45 and the immobilizer circuit 10 is attached to the top of the battery, thereby covering the pad 45. The immobilizer circuit 10 includes solenoid 12 and contacts 43-44, as described above with respect to FIGS. 1 (a-b) and 2. The immobilizer circuit 10 electrically contacts the hidden pad 45 via contact post 51. The immobilizer 10 also contacts the positive post 2 via contact 52. In this manner, the immobilizer 10 can be designed to be snapped onto a standard battery, thereby covering the pad 45 and exposing positive post 2. As shown in FIGS. 4 and 5, the immobilizer 10 is included in a housing, including cover 50, which covers, protects, and hides the immobilizer circuitry 10 as well as the pad 45. In fact, the pad 45 need not even be exposed to the exterior of the battery casing.

The pad 45 is simply a contact point at which the battery cells are electrically connected (ultimately) to the post 2. Usually, a contact from the battery cells extends to the backside of pad 45 and a flame melts the pad 45 and the battery cell contact into the meniscus pad 45 shown in FIG. 4. This pad 45 can be used in battery assembly for high current testing, but is not functionally capable of or designed to receive a usual battery terminal cable. As described above, pad 45 is optional and can be eliminated entirely if desired.

Figure 6:
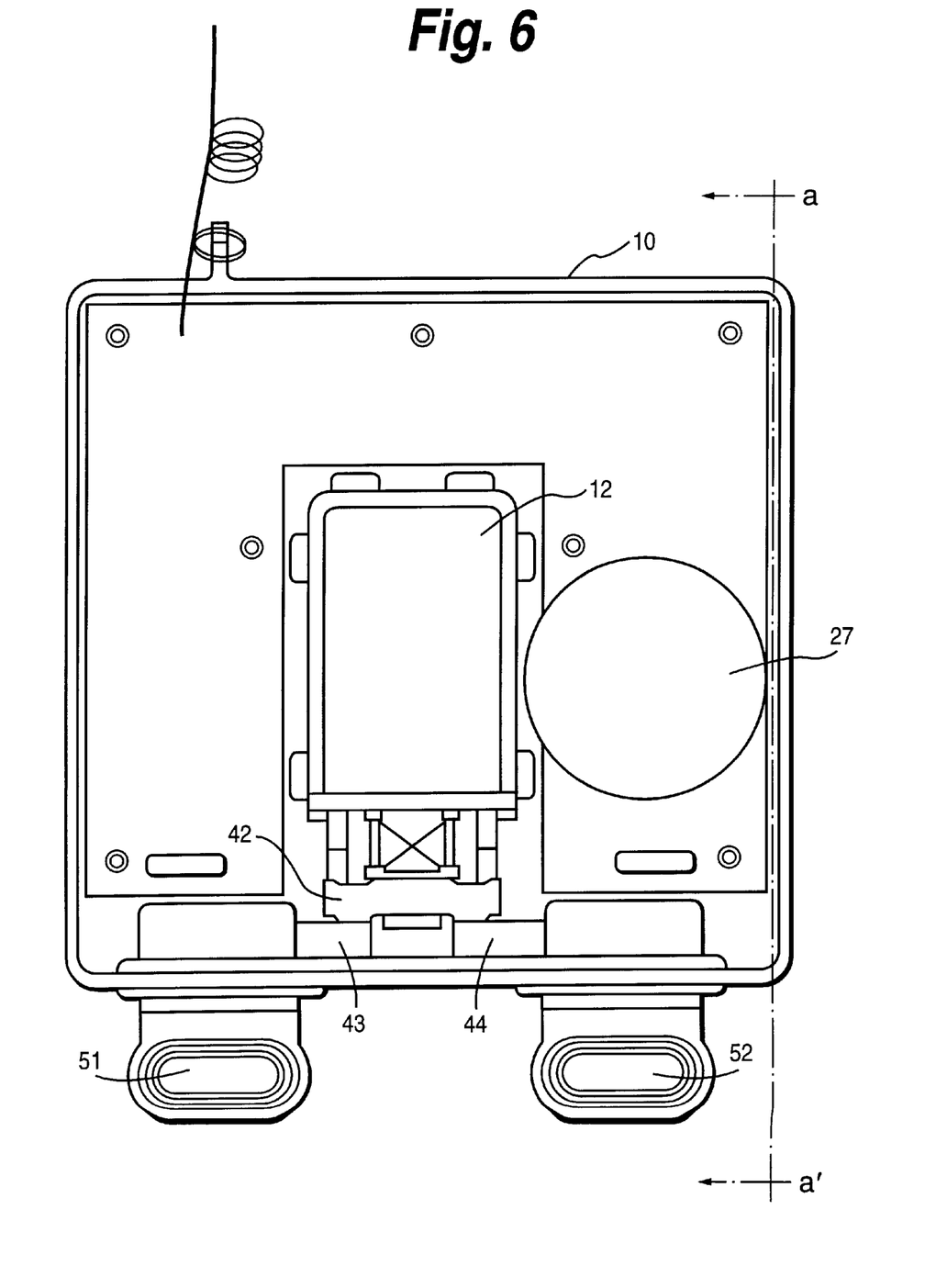
FIG. 6 is a top plan view of an inhibitor circuit from FIG. 3.

Although FIGS. 3–5 illustrate an example embodiment in which the immobilizer circuit 10 may be employed on a battery 1, the present invention is not limited to any particular mechanical configuration in which the immobilizer 10 is provided in, on, or as an inherent part of battery 1. Rather, the immobilizer 10 is significant in that it automatically senses the operation of the starter motor and solenoid, differentiates between that load and alternatively automotive loads, and intelligently chooses whether to immobilize the automobile battery to the ignition switch. When the immobilizer 10 is provided as a separate, possibly snap-on unit to the battery 1, it may take the form of that shown in FIGS. 6 and 7. As an example, in FIG. 6, the inunobilizer 10 is a module, within which solenoid 12 and the other circuit components shown, for example, in FIG. 1c are housed. The speaker 27 can be part of the module as shown in FIG. 6 as well. The module shown in FIG. 6 can attach into, for example, the embodiment of FIGS. 3–4 by connection of the module to the positive post 2 and pad 45 via contacts 51 and 52. Alternatively, the immobilizer 10 may be formed as an inherent part of the battery, such as is shown in FIG. 1.

Figure 7:
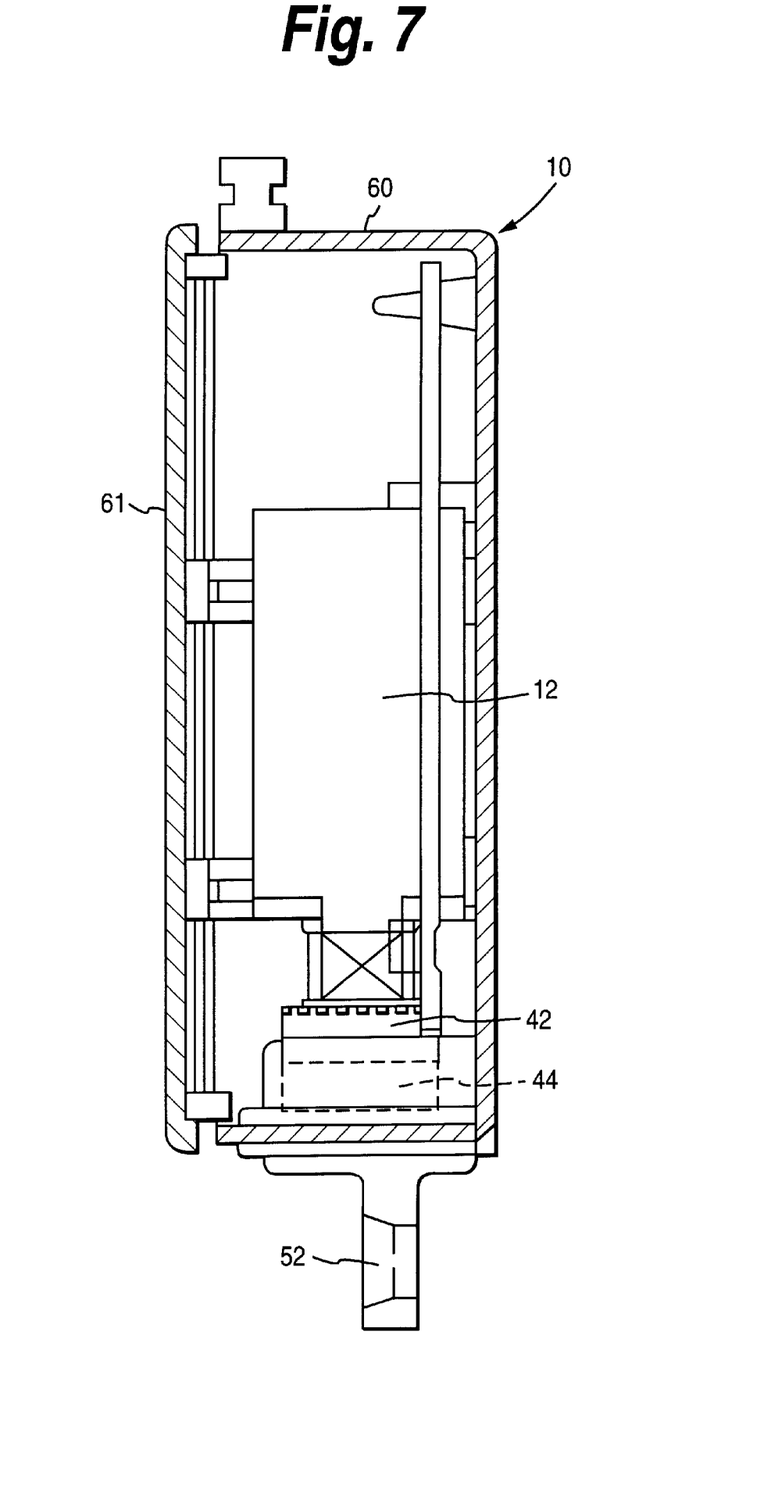
FIG. 7 is a left side sectional view of the inhibitor circuit of FIG. 6 taken along the plane a–a'.

The immobilizer module 10 is housed within a housing 60, as shown in FIG. 7. After placing the circuitry shown in FIG. 1c within the housing 60 and electrically connecting it to the contacts 51 and 52, the circuitry shown in FIG. 1c can be sealed within the housing 60 by heat sealing a lid 61 onto the immobilizer circuit. This heat sealing of the circuitry within the housing 60/61 will resist tampering by unauthorized users.

Other than short period of 5 seconds, the 'solenoid switch' is in the 'closed' position. This is the position where the 'shorting bar' is pushed against contacts 43 and 44 by the spring. Control signals then open the switch upon an unauthorized attempt to start the car.

In the preferred design, the keypad 40 is a radio transmitter mounted in a 'keyfob' which has two button switches. Pushing the green button marked 'disarm' causes the device to transmit a code to the Immobilizer battery module's receiver. The code has two main components: it announces its security code which the module's microprocessor is able to verify as being valid and its signals that the Immobilizer system should remain disarmed, i.e., that the driver does not wish the Immobilizer to operate. While in this 'disarmed' state the engine can be started at any time.

Pushing the red button marked 'arm' also causes the device to transmit a code but, in this case, it signals that the Immobilizer system should remain 'armed' and cause the solenoid switch 12 to 'open' whenever a starter motor current starts to flow. In each such instance, the supply via the MOSFET 15 to the solenoid switch 12 causes it to 'open' for a period of 5 second before the MOSFET 15 'turns off.' With no supply to the solenoid switch, the spring forces the shorting bar against contacts 43 and 44. (If the ignition key is still in the 'engine start' position, the starter motor will again start to pass current and, once more, the solenoid will be made to open for a further 5 seconds, etc.).

Throughout the periods when the Immobilizer system is "disarmed" and "armed," currents other than those to the starter motor are able to pass through the shorting bar of the solenoid.

It is during the periods of 5 seconds duration while the solenoid switch is open that current can pass through resistor R1 and thermal fuse J1. This bypass circuit is included so that the electronic memories of the car receive sufficient electrical power at all times.

As one can see from the previously described examples of the present invention, an immobilizer can be provided to restrict current from battery plates to the starter motor of an automobile by immobilizing the battery through a solenoid switch. More importantly, this can be done by, employing an intelligent circuit such that the battery 1 can be connected electrically to the automobile electrical system in the exact same manner that batteries are currently connected to automobile electrical systems. As a result, users need not be confused or concerned about multiple wires from the automobile electrical system being connected to different types of terminals on the battery. Further, different types of terminals on the battery need not be hidden or rendered inaccessible or inoperative for the starter in order to maintain security of the battery, since the present immobilizer has the intelligence to determine, from a single battery post connection, the types of loads being operated on the automobile. From this, the present immobilizer can intelligently determine whether immobilization of the battery power to the starter motor is necessary.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An automotive battery for powering at least an ignition switch for an automobile starter motor and various other automobile loads, comprising:

a set of cell plates having a common polarity;

a battery post for connection to the ignition switch and the various other automobile loads by a common lead; and an immobilizer in electrical communication between the cell plates and the battery post, including:

a battery voltage input for electrical connection to the set of cell plates;

an ignition switch input for electrical connection to the battery post;

a resistive path between the battery voltage input and the ignition switch input to permit current flow between the set of cell plates and the battery post in an amount greater than zero but less than that typically required to power the starter motor;

a controller including:

a detector circuit to detect an operation of the starter motor attempting to load the battery voltage input; and a processor connected to open the switch in response to the detection by the detector circuit; and a switch in parallel with the resistive path to switch the battery voltage input in connection with the ignition switch input, wherein; the switch remains closed until opened in response to control signals from the controller.

2. A battery according to claim 1, wherein the detector circuit also detects the operation of the various other automobile loads attempting to load the battery voltage input, and differentiates between loading by the starter motor versus loading by the various other automobile loads.

3. A battery according to claim 2, wherein the detector circuit detects a voltage change over time at the battery voltage input.

4. A battery according to claim 3, wherein the detector circuit includes a capacitor to block signals of low voltage change identifying the various other loads and to pass signals of high voltage change identifying the starter motor.

5. A battery according to claim 1, wherein the detector is a spike detector.

6. A battery according to claim 4, wherein the set of cell plates and the immobilizer are all inaccessibly enclosed within a battery housing.

7. A battery according to claim 4, wherein the battery post is a standard battery post and is accessibly extended from the battery housing.

8. A battery according to claim 1, further including a receiver in electrical communication with a keypad, the receiver also in communication with the processor to hold the switch closed when a particular entry is input to the keypad, regardless of any detection by the detector circuit.

9. An immobilizer for an automotive battery electrically connected between a battery post and a set of cell plates the battery for powering a starter motor and various other automotive loads, comprising:

a battery voltage input for electrical connection to the set of cell plates;

an ignition switch input for electrical connection to the battery post;

a resistive path between the battery voltage input and the ignition switch input to permit current flow between the set of cell plates and the battery post in an amount greater than zero but less than that typically required to power the starter motor;

a controller;

a detector circuit to detect an operation of the starter motor attempting to load the battery voltage input; and a processor connected to open the switch in response to the detection by the detector circuit; and a switch in parallel with the resistive path to switch the battery voltage input in connection with the ignition switch input, wherein the switch remains closed until opened in response to control signals from the controller.

10. An immobilizer according to claim 9, wherein the detector circuit also detects the operation of the various other automotive loads attempting to load the battery voltage input, and differentiates between loading by the starter motor.

11. An immobilizer according to claim 10, wherein the detector circuit detects a voltage change over time at the battery voltage input.

12. An immobilizer according to claim 11, wherein the detector circuit includes a capacitor to block signals of low voltage change identifying the various other loads and to pass signals of high voltage change identifying the starter motor.

13. An immobilizer according to claim 9, wherein the detector is a spike detector.

14. An immobilizer according to claim 9, further including a receiver in electrical communication with a keypad in the automobile, the receiver also in communication with the processor to close the switch when a particular entry is input to the keypad, regardless of any detection by the detector circuit.

15. A method of immobilizing an automobile battery having a set of battery cell plates and a corresponding battery post, the automobile battery for use in an automobile having a security entry device, comprising the steps of:

detecting a voltage at the cell plates;

analyzing the voltage to determine if a corresponding current is being drawn to a generally resistive load or a to a generally reactive load based on its change over time;

detecting whether the security entry device has been engaged; and, if the current is being drawn to a generally resistive load, permitting a current to pass to the resistive load, and if the current is being drawn to a generally reactive load, restricting the current from passing to the reactive load unless the entry device has been detected as engaged.

16. The method according to claim 15, wherein current is determined to be drawn to a generally resistive load if the voltage is determined to change insubstantially over time and is determined to be drawn to a generally reactive load if the voltage is determined to change substantially over time.

17. The method according to claim 15, further including the step, if the current is being drawn to a generally reactive load and the entry device has been detected as engaged, of maintaining electrical contact between the set of battery cell plates and the corresponding battery post.

* * * * *